US012564786B2

(12) United States Patent
Feng et al.

(10) Patent No.: US 12,564,786 B2
(45) Date of Patent: Mar. 3, 2026

(54) INTERACTIVE CONTROL METHOD, APPARATUS, COMPUTER DEVICE, AND READABLE STORAGE MEDIUM

(71) Applicant: Beijing Zitiao Network Technology Co., Ltd., Beijing (CN)

(72) Inventors: Qidi Feng, Beijing (CN); Zhangzheng Chen, Beijing (CN); Borui Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 253 days.

(21) Appl. No.: 18/350,957

(22) Filed: Jul. 12, 2023

(65) Prior Publication Data

US 2024/0033632 A1 Feb. 1, 2024

(30) Foreign Application Priority Data

Jul. 26, 2022 (CN) .......................... 202210886046.2

(51) Int. Cl.
*A63F 13/55* (2014.01)
*A63F 13/53* (2014.01)

(52) U.S. Cl.
CPC .............. *A63F 13/55* (2014.09); *A63F 13/53* (2014.09)

(58) Field of Classification Search
CPC .................................. A63F 13/55; A63F 13/53
See application file for complete search history.

(56) References Cited

U.S. PATENT DOCUMENTS

2022/0032187 A1* 2/2022 Hu ........................ A63F 13/537
2022/0040574 A1 2/2022 Li
2022/0040578 A1 2/2022 Hu et al.

FOREIGN PATENT DOCUMENTS

| CN | 111589136 A | 8/2020 |
| CN | 112274927 A | 1/2021 |
| CN | 112402949 A | 2/2021 |
| CN | 112426718 A | 3/2021 |
| CN | 112843719 A | 5/2021 |

(Continued)

OTHER PUBLICATIONS

"LOL How do I set a single skill to manual casting and other skills to smart casting?", Retrieved from URL: https://zhidao.baidu.com/quest ion/304339684998478484.html, 5 pages.

(Continued)

*Primary Examiner* — Ke Xiao

(57) ABSTRACT

The present disclosure provides an interactive control method, apparatus, computer device, and readable storage medium. The interactive control method includes: in response to a first trigger operation on a target control, controlling the plurality of virtual objects to enter a first state, and presenting a piece of first indication information corresponding to the first state in a region corresponding to the virtual object identifier; in response to a first change operation on a state of a target virtual object, controlling the target virtual object to enter a second state, and presenting a piece of second indication information corresponding to the second state in a region corresponding to a virtual object identifier of the target virtual object; and the second state refers to a state in which a virtual object manually releases a skill.

18 Claims, 5 Drawing Sheets

In response to a first trigger operation on a target control, controlling the plurality of virtual objects to enter a first state, and presenting a first indication information corresponding to the first state in a region corresponding to the virtual object identifier; the first state refers to a state in which a virtual object automatically releases a skill. ⟩ S101

In response to a first change operation on a state of a target virtual object, controlling the target virtual object to enter a second state, and presenting a second indication information corresponding to the second state in a region corresponding to a virtual object identifier of the target virtual object; the second state refers to a state in which a virtual object manually releases a skill, and the target virtual object is any one of the plurality of virtual objects. ⟩ S102

(56)          References Cited

FOREIGN PATENT DOCUMENTS

| CN | 113244608 A | 8/2021 |
| CN | 113521759 A | 10/2021 |
| CN | 115006838 B | 7/2024 |
| IN | 201737039093 A | 12/2017 |
| KR | 10-2022-0008709 A | 1/2022 |

OTHER PUBLICATIONS

Office action received from Chinese patent application No. 202210886046.2 mailed on Mar. 27, 2024, 12 pages (5 pages English Translation and 7 pages Original Copy).

Notice of Allowance received from Chinese patent application No. 202210886046.2 mailed on Jun. 17, 2024, 06 pages (2 pages English Translation and 4 pages Original Copy).

* cited by examiner

In response to a first trigger operation on a target control, controlling the plurality of virtual objects to enter a first state, and presenting a first indication information corresponding to the first state in a region corresponding to the virtual object identifier; the first state refers to a state in which a virtual object automatically releases a skill.　S101

In response to a first change operation on a state of a target virtual object, controlling the target virtual object to enter a second state, and presenting a second indication information corresponding to the second state in a region corresponding to a virtual object identifier of the target virtual object; the second state refers to a state in which a virtual object manually releases a skill, and the target virtual object is any one of the plurality of virtual objects.　S102

FIG. 1

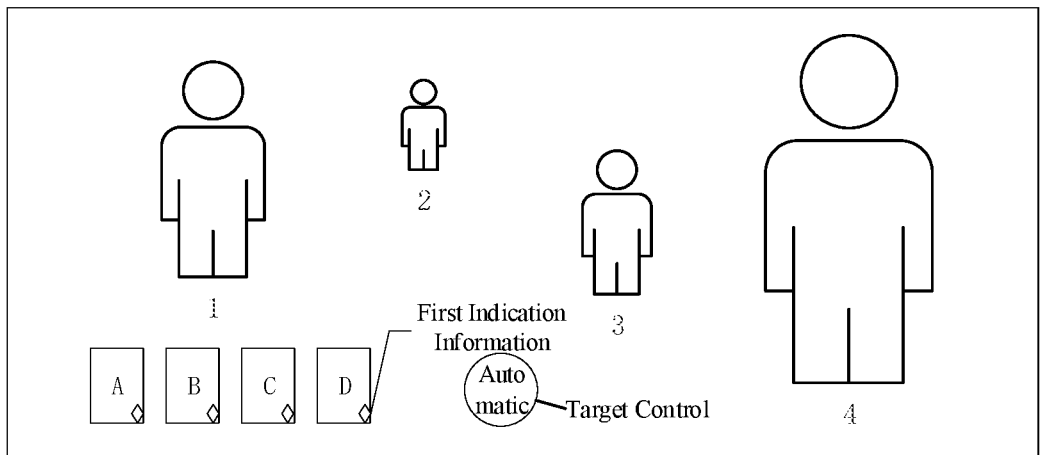

FIG. 2

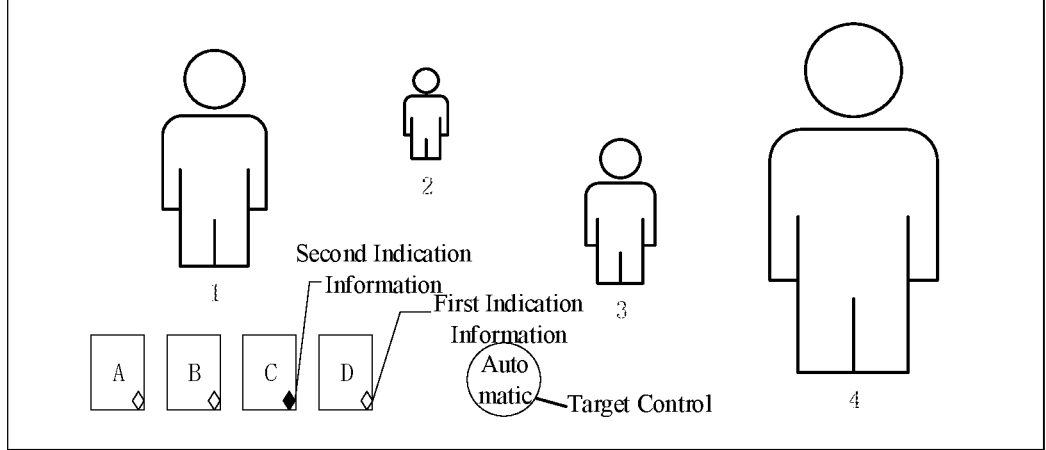

FIG. 3

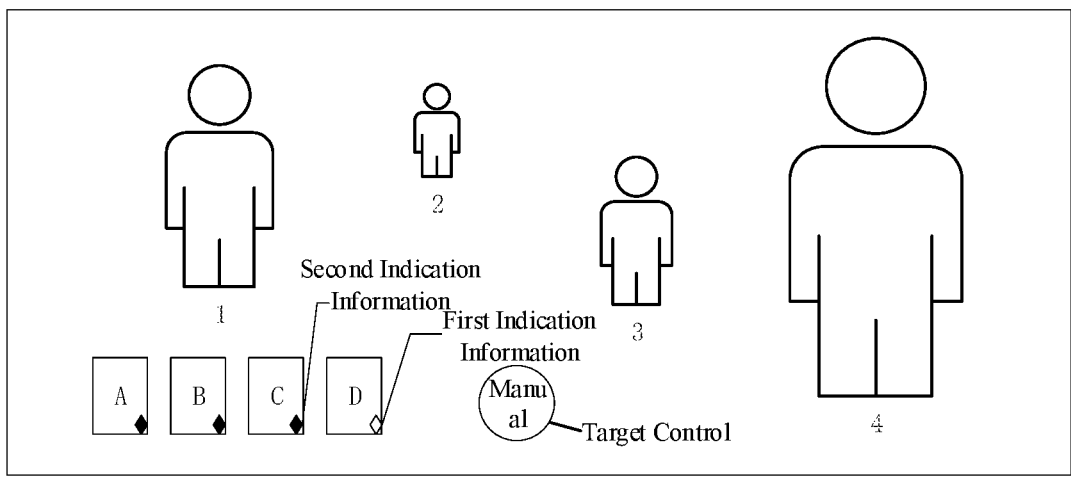

FIG. 4

In response to the target virtual object being in the first state, releasing a skill corresponding to the target virtual object in the case where the target virtual object satisfies a preset skill release condition.    S501

In response to the target virtual object entering the second state, releasing the skill corresponding to the target virtual object in response to a user trigger in the case where the target virtual object satisfies the preset skill release condition.    S502

FIG. 5

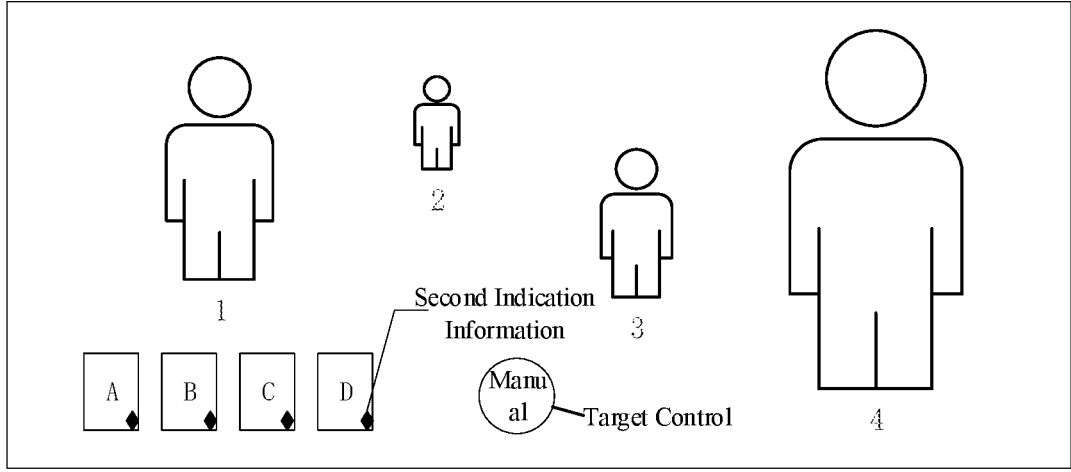

FIG. 6

INTERACTIVE CONTROL METHOD, APPARATUS, COMPUTER DEVICE, AND READABLE STORAGE MEDIUM

CROSS-REFERENCE TO RELATED APPLICATION

The present disclosure claims priority of Chinese Patent Application No. 202210886046.2 filed on Jul. 26, 2022 and entitled "interactive control method, apparatus, computer device and readable storage medium", and the entire content disclosed by the Chinese patent application is incorporated herein by reference as part of the present disclosure.

TECHNICAL FIELD

The present disclosure relates to the technical field of games, in particular, to an interactive control method, apparatus, computer device and readable storage medium.

BACKGROUND

In some games, in order to facilitate the user's control, during the process of skill release, the user can choose an automatic skill release manner to reduce the user's operating pressure. However, because the automatic skill release manner has certain deficiencies, the skill release cannot be performed completely according to the user's idea, which makes the effect produced during skill release poor and leads to poor interactivity of the game process.

SUMMARY

Embodiments of the present disclosure at least provides an interactive control method, apparatus, computer device and readable storage medium.

A first aspect, embodiments of the present disclosure provide an interactive control method. The interactive control method is applied to a terminal device. The virtual scene is displayed in an operation interface of the terminal device, the virtual scene includes a plurality of virtual objects and a virtual object identifier corresponding to each virtual object. The interactive control method includes:

in response to a first trigger operation on a target control, controlling the plurality of virtual objects to enter a first state, and presenting a first indication information corresponding to the first state in a region corresponding to the virtual object identifier, wherein the first state refers to a state in which a virtual object automatically releases a skill; and in response to a first change operation on a state of a target virtual object, controlling the target virtual object to enter a second state, and presenting a second indication information corresponding to the second state in a region corresponding to a virtual object identifier of the target virtual object, wherein the second state refers to a state in which a virtual object manually releases a skill, and the target virtual object is any one of the plurality of virtual objects.

In an alternative embodiment, the method further includes:

in response to the target virtual object being in the first state, releasing a skill corresponding to the target virtual object in a case where the target virtual object satisfies a preset skill release condition; and in response to the target virtual object entering the second state, releasing the skill corresponding to the target virtual object in response to a user trigger in the case where the target virtual object satisfies the preset skill release condition.

In an alternative embodiment, the method further includes: displaying, in a preset manner, the virtual object identifier of the target virtual object entering the second state in a case where the target virtual object entering the second state satisfies the preset skill release condition.

In an alternative embodiment, the method further includes:

presenting a first control indication information in a region where the target control is located before responding to the first trigger operation;

changing the first control indication information presented in the region where the target control is located to a second control indication information after responding to the first trigger operation; and in response to an amount of target virtual objects currently in the second state reaching a preset threshold, changing the second control indication information presented in the region where the target control is located to the first control indication information.

In an alternative embodiment, the target virtual object satisfying the preset skill release condition includes: a first value associated with the target virtual object reaching a preset value. The first value is used to represent current accumulated amount of resource consumption required to release the skill corresponding to the target virtual object, or remaining time to trigger the virtual object identifier corresponding to the target virtual object not to respond to release of the skill.

In an alternative embodiment, the method further includes:

determining whether an amount of target virtual objects currently in the second state reaches a preset threshold in response to a second trigger operation on the target control; and controlling the plurality of virtual objects to enter the first state in response to the amount of the target virtual objects currently in the second state reaching the preset threshold.

In an alternative embodiment, each virtual object corresponds to a plurality of skills, and the method further includes:

in response to a second change operation on a state of the target virtual object, controlling the target virtual object to enter a third state, and presenting a third indication information corresponding to the third state in the region corresponding to the virtual object identifier of the target virtual object. The third state refers to a state in which a skill of an automatic release state and a skill of a manual release state exist simultaneously in the plurality of skills of the virtual object.

In an alternative embodiment, the method further includes:

in a case where the target virtual object enters the third state, modifying a release manner of a target skill in response to a state change operation on the target skill among the plurality of skills of the target virtual object.

A second aspect, embodiments of the present disclosure also provide an interactive control apparatus. The interactive control apparatus is applied to a terminal device, wherein a virtual scene is displayed in an operation interface of the terminal device, the virtual scene comprises a plurality of virtual objects and a virtual object identifier corresponding to each virtual object. The interactive control apparatus includes:

a first control module, configured to, in response to a first trigger operation on a target control, control the plurality of virtual objects to enter a first state, and present a first indication information corresponding to the first state in a region corresponding to the virtual object identifier, wherein the first state refers to a state in which a virtual object automatically releases a skill; and a second control module, configured to, in response to a first change operation on a state of a target virtual object, control the target virtual object to enter a second state, and present a second indication information corresponding to the second state in a region corresponding to a virtual object identifier of the target virtual object, wherein the second state refers to a state in which a virtual object manually releases a skill, and the target virtual object is any one of the plurality of virtual objects.

In an alternative embodiment, the apparatus further includes:

a first release module, configured to, in response to the target virtual object being in the first state, release a skill corresponding to the target virtual object in a case where the target virtual object satisfies a preset skill release condition; and a second release module, configured to, in response to the target virtual object entering the second state, release the skill corresponding to the target virtual object in response to a user trigger in the case where the target virtual object satisfies the preset skill release condition.

In an alternative embodiment, the apparatus further includes:

a display module, configured to display, in a preset manner, the virtual object identifier of the target virtual object entering the second state in a case where the target virtual object entering the second state satisfies the preset skill release condition.

In an alternative embodiment, the apparatus further includes:

a presentation module, configured to present a first control indication information in a region where the target control is located before responding to the first trigger operation;

a first change module, configured to change the first control indication information presented in the region where the target control is located to a second control indication information after responding to the first trigger operation; and a second change module, configured to, in response to an amount of target virtual objects currently in the second state reaching a preset threshold, change the second control indication information presented in the region where the target control is located to the first control indication information.

In an alternative embodiment, the target virtual object satisfying the preset skill release condition includes: a first value associated with the target virtual object reaching a preset value. The first value is used to represent current accumulated amount of resource consumption required to release the skill corresponding to the target virtual object, or remaining time to trigger the virtual object identifier corresponding to the target virtual object not to respond to release of the skill.

In an alternative embodiment, the apparatus further includes:

a determination module, configured to determine whether an amount of target virtual objects currently in the second state reaches a preset threshold in response to a second trigger operation on the target control; and a third control module, configured to control the plurality of virtual objects to enter the first state in response to the amount of the target virtual objects currently in the second state reaching the preset threshold.

In an alternative embodiment, each virtual object corresponds to a plurality of skills, and the interactive control apparatus further includes:

a fourth control module, configured to, in response to a second change operation on a state of the target virtual object, control the target virtual object to enter a third state, and present a third indication information corresponding to the third state in the region corresponding to the virtual object identifier of the target virtual object. The third state refers to a state in which a skill of an automatic release state and a skill of a manual release state exist simultaneously in the plurality of skills of the virtual object.

In an alternative embodiment, the apparatus further includes:

a modification module, configured to, in a case where the target virtual object enters the third state, modify a release manner of a target skill in response to a state change operation on the target skill among a plurality of skills of the target virtual object.

A third aspect, embodiments of the present disclosure also provide a computer device. The computer device includes a processor, a memory, and a bus, and the memory is configured to store machine-readable instructions executable by the processor, the processor is communicated with the memory via the bus when the computer device is in operation, the machine-readable instructions, when executed by the processor, are configured to perform the steps in the first aspect described above or any possible implementation of the first aspect.

A fourth aspect, embodiments of the present disclosure also provide a computer-readable storage medium. The computer program is stored on the computer-readable storage medium, and when the computer program is executed by a processor, the steps in the first aspect described above or any possible implementation of the first aspect are executed.

An interactive control method, apparatus, computer device, and readable storage medium provided by the embodiments of the present disclosure can control a plurality of virtual objects to enter an automatic release skill state by performing a first trigger operation on a target control, and present a piece of first indication information corresponding to the automatic release skill state; and for a target virtual object among the plurality of virtual objects, control the target virtual object to enter a second state of manual release skill by performing a first change operation on the state of the target virtual object, and present a piece of second indication information corresponding to the manual release skill state, so that when the skills are automatically released, the user can select the skills of some virtual objects to release manually, so as to not only ensure the automatic release of skills to reduce the user's operating pressure, but also be able to independently and manually release certain skills at an appropriate time to ensure the user's requirements to independently control the release of certain skills and improve the interactivity during the game.

In order to make the above objects, features and advantages of the present disclosure more obviously and easier to understand, the following is a detailed description of pre-ferred embodiments, with the attached drawings.

BRIEF DESCRIPTION OF DRAWINGS

In order to explain the technical scheme of the embodi-ment of the present disclosure more clearly, the following will briefly introduce the drawings needed in the embodi-ment, which are incorporated into and constitute a part of this specification. These drawings show the embodiment in line with the present disclosure and together with the speci-fication, serve to explain the technical scheme of the present disclosure. It should be understood that the following draw-ings only show some embodiments of the present disclosure, so they should not be regarded as limiting the scope. For ordinary people in the field, other related drawings can be obtained according to these drawings without creative work.

FIG. 1 illustrates a flowchart of an interactive control method provided by some embodiments of the present disclosure;

FIG. 2 illustrates a first example diagram of an operation interface provided by some embodiments of the present disclosure;

FIG. 3 illustrates a second example diagram of an opera-tion interface provided by some embodiments of the present disclosure;

FIG. 4 illustrates a third example diagram of an operation interface provided by some embodiments of the present disclosure;

FIG. 5 illustrates a flowchart of an interactive control method provided by some embodiments of the present disclosure;

FIG. 6 illustrates a fourth example diagram of an opera-tion interface provided by some embodiments of the present disclosure;

DETAILED DESCRIPTION

Figure 7:
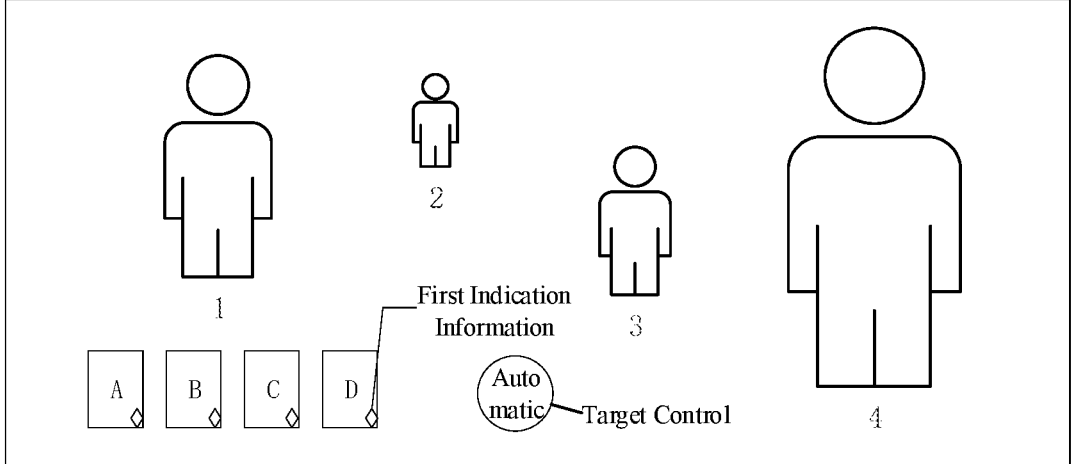
FIG. 7 illustrates a fifth example diagram of an operation interface provided by some embodiments of the present disclosure.

In order to make the purpose, technical scheme and advantages of the embodiment of the disclosure more clearly, the technical scheme in the embodiment of the disclosure will be described clearly and completely with the attached drawings. Obviously, the described embodiment is only a part of the embodiment of the disclosure, but not the whole embodiment. The components of the embodiments of the present disclosure generally described and illustrated in the drawings herein may be arranged and designed in various different configurations. Therefore, the following detailed description of the embodiments of the disclosure provided in the accompanying drawings is not intended to limit the scope of the claimed disclosure, but merely repre-sents selected embodiments of the disclosure. Based on the embodiment of the present disclosure, all other embodi-ments obtained by those skilled in the art without creative work belong to the scope of protection of the present disclosure.

The research found that many games provide a combat mode that automatically releases skills, so as to relieve the user's operating pressure. In the combat mode of automatic release of skills, the game engine will automatically take over the release operation of skills in the game and auto-matically control the release of skills; and a more complete artificial intelligence (AI) may also select the most appro-priate skill to release from a plurality of skills according to the current battle situation, which greatly reduces the user's operational burden.

The combat mode of automatically releasing skills satis-fies the requirement of the user to free their hands. However, because different virtual objects have different positions, assuming that a skill of a virtual object need to be released at a specific timing, if it is in the combat mode of automati-cally releasing skills at this time, the user cannot accurately determine the release timing of the target skill; however, if it is in a combat mode of manually releasing skills at this time, then the user needs to operate the corresponding skills of a plurality of virtual objects at the same time, which will not only bring huge operating pressure to the user, but also cause the user to miss other operating opportunities. In general, neither a single combat mode of automatically releasing skills nor a single combat mode of manually releasing skills can satisfy the user's control requirements for skill release, resulting in poor interactivity in the current game process.

Based on the above research, an interactive control method provided by the present disclosure can control a plurality of virtual objects to enter a first state of automati-cally releasing a skill by performing a first trigger operation on a target control, and present a piece of first indication information corresponding to the automatic release skill state; and for a target virtual object among the plurality of virtual objects, the method can control the target virtual object to enter a second state of manually releasing a skill by performing a first change operation on the state of the target virtual object, and present a piece of second indication information corresponding to the manual release skill state. As such, when the skills are automatically released, the user can select the skills of some virtual objects to release manually, so as to not only ensure the automatic release of skills to reduce the user's operating pressure, but also be able to independently and manually release certain skills at an appropriate time to ensure the user's requirements to independently control the release of certain skills and improve the interactivity during the game.

The defects in the above-mentioned such as poor inter-activity in the current game process are all the results obtained by the inventor after practice and careful research. Therefore, the discovery process of the above-mentioned problems and the solutions proposed by the present disclo-sure below for the above-mentioned problems should be the inventor' contributions to the present disclosure during the present disclosure process.

It should be noted that like numerals and letters denote similar items in the following drawings, therefore, once an item is defined in one drawing, it does not require further definition and explanation in subsequent drawings.

In order to facilitate the understanding of the present embodiment, firstly, a detailed introduction is given to an interactive control method disclosed in the embodiment of the present disclosure. The execution subject of the interactive control method provided in the embodiment of the present disclosure is generally a computer device with a certain computing capability. The computer device includes, for example, a terminal device or a server or other processing device, and the terminal device may be a user equipment (UE), a mobile device, a user terminal, a terminal, a cellular phone, a cordless phone, a personal digital assistant (PDA), a handheld device, a computing device, an in-vehicle device, a wearable device, etc. In some possible implementation manners, the interactive control method may be implemented by a processor invoking computer-readable instructions stored in a memory.

The terminal device is installed an application program equipped with the method. It should be noted that the application program may also run on a server, the relevant data processing is completed through the server, and the terminal device is used as a display device to display the data sent by the server. When the application program is running on the terminal device, a virtual scene is displayed on an interface of the terminal device, and at least one virtual object is included in the virtual scene.

The interactive control method provided by the embodiments of the present disclosure can be applied to any virtual scene where interactive control of virtual objects is performed in addition to being used in games. Games may include, for example, role-playing games, action games, strategy games, fighting games, sports games, adventure games, auto chess games, etc., all of which can adopt the interactive control method provided by the embodiments of the present disclosure, and no specific limitation is set here.

Taking the case where the interactive control method provided by the embodiments of the present disclosure is applied to games as an example, the technical terms in the embodiments of the present disclosure are explained below.

When a game is running on a terminal device, a virtual scene of the game may be displayed on an interface of the terminal device.

Various objects are included in the virtual scene; various objects in the game scene may include but not limited to virtual objects controlled by the user, non-player characters (NPCs), etc.; and the virtual objects that may be controlled by the user may include but not limited to at least one of virtual characters and virtual animals, the virtual objects that may be controlled by the user, and the non-player characters are set according to game requirements, and there is no specific limitation here. In addition, the virtual objects may also include virtual buildings, virtual plants, virtual props, and the like.

The virtual scene further includes virtual object identifiers respectively corresponding to a plurality of virtual objects. The virtual object identifier includes, for example, a card, an icon, etc. corresponding to the virtual object. The virtual object identifier is used to indicate a state of a corresponding virtual object to the user, or provide the user with an operation interface on the virtual object. In a possible implementation, the user may release the skills of the corresponding virtual object by triggering the virtual object identifier; or the virtual object identifier may be used to show the user whether the virtual object corresponding to the virtual object identifier is currently in a state where the skill can be released, etc.

The interactive control method provided by some embodiments of the present disclosure will be described below by taking the case where the execution subject is a terminal device as an example.

Referring to FIG. 1, and FIG. 1 is a flowchart of an interactive control method provided by the embodiments of the present disclosure. The interactive control method is applied to a terminal device; a virtual scene is displayed in an operation interface of the terminal device; and the virtual scene includes a plurality of virtual objects and a virtual object identifier corresponding to each virtual object. The method includes steps S101 to S102.

S101: in response to a first trigger operation on a target control, controlling the plurality of virtual objects to enter a first state, and presenting a first indication information corresponding to the first state in a region corresponding to the virtual object identifier, and the first state refers to a state in which a virtual object automatically releases a skill.

S102: in response to a first change operation on a state of a target virtual object, controlling the target virtual object to enter a second state, and presenting a second indication information corresponding to the second state in a region corresponding to a virtual object identifier of the target virtual object; the second state refers to a state in which a virtual object manually releases a skill, and the target virtual object is any one of the plurality of virtual objects.

The above-mentioned S101-S102 will be described in detail below.

For the above-mentioned S101:

Referring to FIG. 2, FIG. 2 is a first example diagram of an operation interface provided by the embodiments of the present disclosure. As illustrated in FIG. 2, a virtual scene is displayed on the operation interface, and the virtual scene includes four virtual objects 1, 2, 3, and 4, and virtual object identifiers A, B, C, and D respectively corresponding to each virtual object. The target control is also displayed in the operation interface, and the character "automatic" is displayed on the target control at this time, the character is used to indicate that the current skill release manner for the virtual object is automatic. When the target control is in an original state, it indicates that the plurality of virtual objects are in the second state, that is, the state in which the plurality of virtual objects manually release skills; and when the user performs the first trigger operation on the target control, the plurality of virtual objects enter the second state, that is, the state in which the virtual object automatically releases skills. The first trigger operation may include single-click, long-press, double-click, etc. on the target control.

In another embodiment, after controlling the plurality of virtual objects to enter the first state, presenting the first indication information corresponding to the first state in the region corresponding to the virtual object identifier. For example, a thick border is presented around the region where the virtual object identifier is located, or effects such as glowing and flickering may be displayed, and a luminous point or strip of a specific color or a special effect may also be displayed in the region where the virtual object identifier is located; or special marks, such as a ring mark, a hollow diamond mark, etc., may also be displayed in the region where the virtual object identifier is located, which are used to indicate that the virtual object is in the first state of automatically releasing skills.

In the example illustrated in FIG. 2, a hollow diamond mark is displayed as the first indication information in the region where each virtual object identifier is located, to indicate that the plurality of virtual objects have all entered the first state.

For the above-mentioned S102:

The target virtual object may be, for example, any one of the plurality of virtual objects in the virtual scene.

The first change operation for the state of the target virtual object may be, for example, a trigger operation on the virtual object displayed in the virtual scene, or a trigger operation on a virtual object identifier associated with the virtual object. The trigger operation includes, for example, a single-click operation, a double-click operation, a heavy-press operation, a drag operation, etc.

Taking the case where the first change operation is the trigger operation on the virtual object identifier as an example, the single-click operation is, for example, determining to trigger the first change operation after detecting that the user performs a single-click or double-click operation on the virtual object identifier; the heavy-press operation is, for example, determining to trigger the first change operation after detecting that the force of the click or press on the virtual object identifier is greater than the preset force threshold; and the drag operation is, for example, determining to trigger the first change operation after detecting that the virtual object identifier is dragged to a certain region of the operation interface.

Taking the operation of the virtual object identifier associated with the virtual object as an example, refer to FIG. 3, which is a second example diagram of an operation interface proposed by the embodiments of the present disclosure. As illustrated in FIG. 3, selecting the virtual object corresponding to the virtual object identifier C as the target virtual object, and performing the first change operation on the state of the target virtual object to control the target virtual object to enter the second state of manually releasing skills. After the target virtual object enters the second state, the second indication information corresponding to the second state is presented in the region corresponding to the virtual object identifier of the target virtual object.

As illustrated in FIG. 3, a solid diamond mark is displayed in the region where the virtual object identifier C is located as the second indication information to indicate that the current target virtual object has entered the second state. In other embodiments, it is also possible to display a luminous point, a luminous strip, etc. of a specific color or special effect different from the first indication information in the region where the virtual object identifier is located, or display a special identifier different from the first indication information, such as a dotted border, a circular mark as the second indication information, etc., which is used to indicate that the virtual object is in the second state of manually releasing skills.

In another embodiment, the user can change the state of the target virtual object through the first change operation on the state of the target virtual object. Therefore, in theory, the user may change the state of each virtual object to the second state after the first change operation. And when the amount of target virtual objects changed to the second state is sufficient, that is, when the amount of target virtual objects currently in the second state reaches the preset threshold, in order to reduce the operation difficulty of the user, at this time, the second control indication information displayed in the region where the target control is located may be changed to the first control indication information, at this time, the target control may respond to the first trigger operation again to facilitate the user to change the target virtual object in the second state to the first state again.

In the example illustrated in FIG. 3, when most of the cards are in the first state of automatically releasing skills, the character "automatic" is displayed on the target control.

However, when the amount of virtual objects adjusted to manual operation through the first change operation exceeds the preset threshold, the character displayed on the target control may be changed from "automatic" to "manual", which is used to indicate that all or most of the current skill release manners for virtual objects are manual. For example, when 3 of the 4 virtual objects illustrated in FIG. 4 are changed from the first state to the second state through the first change operation, the "automatic" displayed on the target control is changed to "manual".

In another embodiment of the present disclosure, after a target virtual object enters the second state, controlling the state of the target virtual object to change from the second state to the first state in response to an operation of changing the state of the target virtual object again, so that the user can flexibly control the skill release manner of each virtual object.

Referring to FIG. 5, a flowchart of an interactive control method provided by other embodiments of the present disclosure further includes steps S501-S502.

S501: in response to the target virtual object being in the first state, releasing a skill corresponding to the target virtual object in the case where the target virtual object satisfies a preset skill release condition.

S502: in response to the target virtual object entering the second state, releasing the skill corresponding to the target virtual object in response to a user trigger in the case where the target virtual object satisfies the preset skill release condition.

The above-mentioned S501-S502 will be described in detail below.

Regarding the above-mentioned S501, when the target virtual object is in the first state of automatically releasing skills, and in the case where the target virtual object satisfies the preset skill release condition, the game engine may automatically release the kill corresponding to the target virtual object. In this case, there is no need for the user to operate, as long as the preset skill release condition is satisfied, the skill corresponding to the target virtual object may be automatically released.

Regarding the above-mentioned S502, when the target virtual object is in the second state of manually releasing skills, the game engine will not automatically control the target virtual object to release the skill corresponding to the target virtual object in the case where the target virtual object satisfies the preset skill release condition, but will wait for the trigger of the user.

Under the condition that the target virtual object is in the second state of manually releasing skills, if the target virtual object satisfies the preset skill release condition, the target virtual object may not release the skill at this time; and only the target virtual object satisfies the preset skill release condition, and when the user triggers the release of the skill corresponding to the target virtual object, the game engine controls the target virtual object to release the corresponding skill.

In a possible implementation, displaying the virtual object identifier of the target virtual object entering the second state in a preset manner in the case where the target virtual object entering the second state satisfies the preset skill release condition.

Exemplarily, the game engine does not release the corresponding skill in the case where the target virtual object is in the second state, but the game engine may show the user that the skill of the target virtual object is in a releasable state, that is, the virtual object identifier of the target virtual object entering the second state is displayed in a preset manner, such as marking the text "current skill can be released", "energy is full", or displaying a flickering or highlighted energy bar, etc., to show and remind the user that the skill may be released through a trigger operation.

For example, the target virtual object satisfying the preset skill release condition includes: a first value associated with the target virtual object reaching a preset value. The first value is used to represent current accumulated amount of resource consumption required to release the skill corresponding to the target virtual object, or remaining time to trigger the virtual object identifier corresponding to the target virtual object not to respond to release of the skill.

Exemplarily, in the case where the first value represents the current accumulated amount of resource consumption required to release the skill corresponding to the target virtual object, the first value refers to the accumulated energy value from the last release of the skill to the current time point. When the current accumulated amount reaches the preset value, the skill corresponding to the target virtual object may be triggered and released by the user.

In the case where the first value represents the remaining time to trigger the virtual object identifier corresponding to the target virtual object not to respond to release of the skill, the first value refers to the remaining skill cooldown (CD) time.

Exemplarily, the first value is displayed in the region where the virtual object identifier is located through an energy bar, a progress bar, or a numerical text.

In another possible implementation, the interactive control method proposed by the embodiments of the present disclosure further includes:

presenting a piece of first control indication information in a region where the target control is located before responding to the first trigger operation;

and changing the first control indication information presented in the region where the target control is located to a piece of second control indication information after responding to the first trigger operation.

Referring to FIG. 6, FIG. 6 is a fourth example diagram of an operation interface proposed by the embodiments of the present disclosure. Referring to FIG. 7, FIG. 7 is a fifth example diagram of an operation interface proposed by the embodiments of the present disclosure.

Exemplarily, as illustrated in FIG. 6, presenting the first control indication information in the region where the target control is located before the user triggers the first trigger operation. The first control indication information is, for example, "manual" to indicate when the target control is in the original state, the user needs to manually release the skills of the virtual object. At this time, the second indication information presented in the virtual object identifier is a solid diamond mark which is used to indicate that each card is in the state of manually release the skills. As illustrated in FIG. 7, changing the first control indication information presented in the region where the target control is located to the second control indication information after the user triggers the first trigger operation. The second control indication information is, for example, "automatic" to indicate that after the first trigger operation of the target control, the skills of each virtual object are automatically released. At this time, the second indication information presented in the region where the virtual object identifier is located is replaced with the first indication information. The first indication information is, for example, a hollow diamond mark, which is used to indicate that each card is in the state of automatically release the skills.

In another possible implementation, the interactive control method proposed by the embodiments of the present disclosure further includes:

determining whether the amount of target virtual objects currently in the second state reaches a preset threshold in response to a second trigger operation on the target control;

and controlling the plurality of virtual objects to enter the first state in response to the amount of target virtual objects currently in the second state reaching the preset threshold.

Here, the second trigger operation on the target control includes, for example, triggering on the target control after the first trigger operation on the target control. The type of the second trigger operation includes, for example, a single-click operation, a double-click operation, a heavy-press operation, or a drag operation on the target control.

In the embodiments of the present disclosure, after controlling each virtual object to enter the first state through the first trigger operation on the target control, the user may individually control one or several virtual objects to enter the second state through the first change operation on the state of the target virtual object, which enables the user to manually release the skills of the target virtual object. Therefore, if the amount of virtual objects entering the second state is large enough, it is usually necessary to trigger the target control twice if the user want to control each virtual object in the second state to enter the first state, which increases the tediousness of the operation. Therefore, in the embodiments of the present disclosure, in order to reduce the tediousness of this operation and facilitate the user to flexibly change the state of the virtual object, after the user triggers the second trigger operation on the target control, the game engine may judge by itself whether the amount of target virtual objects currently in the second state exceeds the preset threshold, and after exceeding the preset threshold, if the user triggers the second trigger operation on the target control, the user may control a plurality of virtual objects to all enter the first state at this time. If the preset threshold is not exceeded, the plurality of virtual objects may be controlled to enter the second state if the user triggers the second trigger operation on the target control.

In another possible embodiment, each virtual object corresponds to a plurality of skills, and under this condition, the interactive control method proposed by the embodiments of the present disclosure further includes:

in response to a second change operation on the state of the target virtual object, controlling the target virtual object to enter a third state, and presenting a piece of third indication information corresponding to the third state in the region corresponding to the virtual object identifier of the target virtual object; the third state refers to a state in which a skill of an automatic release state and a skill of a manual release state exist simultaneously in the plurality of skills of the virtual object.

Exemplarily, the second change operation is, for example, similar to the first change operation, for example, including an operation such as a single-click operation, a double-click operation, a heavy-press operation, or a drag operation, etc. on the target virtual object or the target virtual object identifier.

The change operation on the state of any virtual object may be, for example, cyclic. For example, after a virtual object enters the first state, the first change operation is performed on the state of the virtual object, and the virtual object enters the second state; then the second change operation is performed on the state of the virtual object entering the second state, the virtual object enters the third state. At this time, if the change operation is performed again on the state of the virtual object that has entered the third virtual state, the virtual object will re-enter the first state, and so on.

In addition, the third state may also be called a semi-automatic state, which means that some skills of the target virtual object in the semi-automatic state may be manually controlled to release, and some skills may be automatically controlled to release.

Figure 8:
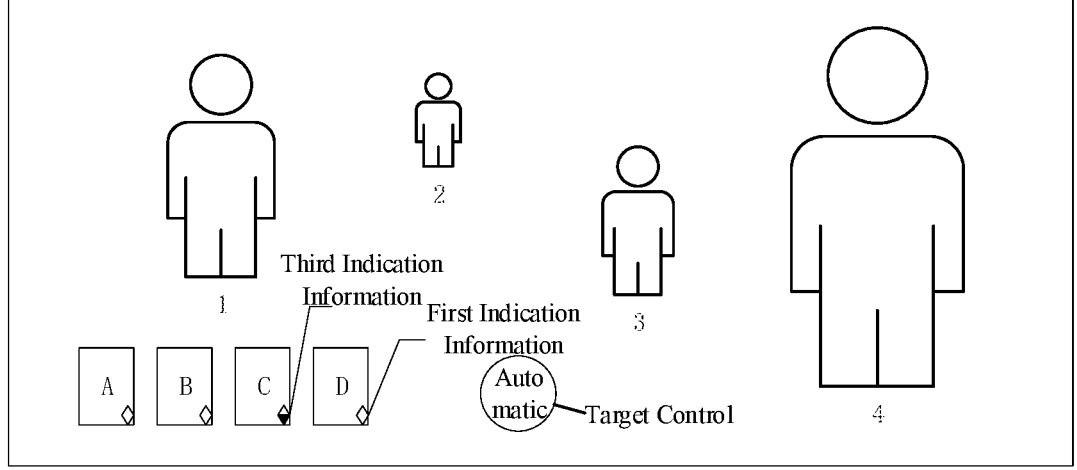
FIG. 8 illustrates a sixth example diagram of an operation interface provided by some embodiments of the present disclosure.

Referring to FIG. 8, FIG. 8 is a fifth example diagram of an operation interface proposed by the embodiments of the present disclosure. When the target virtual object enters the third state, the third indication information corresponding to the third state is presented in the region corresponding to the target virtual object identifier. As illustrated in FIG. 8, the region where the virtual object identifier C of the target virtual object is located displays a semi-solid diamond mark, which is used to prompt the user that the target virtual object is in the third state. In addition, the third indication information may also be in other forms, such as other animation effects, or identifiers, etc.

In addition, all virtual objects may also be controlled to enter the third state through the target control, in this case, the region where the target control is located may also display the third control indication information. For example, the third control indication information includes "semi-automatic" to indicate that in the current state, each virtual object enters a semi-automatic state, some skills of each virtual object may be released automatically by the game engine, and some skills may be released manually by the user.

Figure 9:
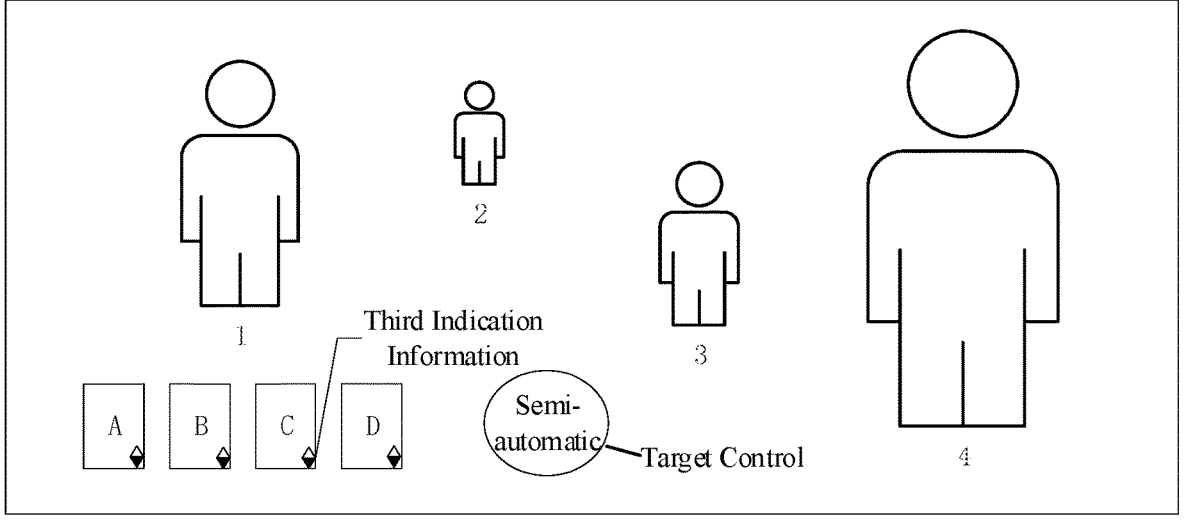
FIG. 9 illustrates a seventh example diagram of an opera-tion interface provided by some embodiments of the present disclosure.

In the example illustrated in FIG. 9, all virtual objects are controlled by the target control to enter the third state, at this time, the region where the target control is located displays the third control indication information, and the region where each virtual object identifier is located displays the third indication information with a "semi-solid diamond" shape.

In a possible implementation, because each virtual object corresponds to a plurality of skills, when the plurality of skills satisfy the skill release condition at the same time, if the skills that need to be automatically released are immediately automatically released at this time, it may result in that the user cannot manually trigger the skills that need to be released manually in this case, so the skills that need to be released manually may not be released in time. Therefore, in the embodiments of the present disclosure, in the case that, among the plurality of skills of the target virtual object, there are skills that need to be released manually and skills that need to be released automatically satisfy the preset skill release condition simultaneously, within a certain period of time, the skills that need to be released automatically may not be released automatically first, but wait for a certain preset time; and in response to exceeding the preset time and the user does not trigger the manual release of the skills that needs to be released manually, the game engine automatically releases the skills that needs to be released automatically. If within the preset time period, the user triggers a skill that needs to be released manually, the corresponding target virtual object is controlled to release the skill that needs to be released manually. In this way, a certain amount of time can be left for the user to judge whether to manually release the skill that needs to be manually released by the target virtual object, thereby improving the flexibility of skill release.

In another possible implementation, in the case where the target virtual object enters the third state, the release manner of the target skill may also be modified in response to a state change operation on the target skill among a plurality of skills of the target virtual object.

Exemplarily, a plurality of skill controls of the virtual object may be displayed on the operation interface. Users may trigger modifications in the release manner of the skills corresponding to the skill controls by certain specific trigger operations, such as a long-press operation, a drag operation, etc.

For example, when a target skill of a virtual object is in the automatic release state, a long-press operation is performed on the skill control of the target skill to adjust the target skill from the automatic release state to the manual release state; and when the target skill of the virtual object is in the manual release state, a long-press operation is performed on the skill control of the target skill to adjust the target skill from the manual release state to the automatic release state.

For another example, two regions are set in the operation interface, respectively including a first region corresponding to automatic operation, and a second region corresponding to manual operation. After the user triggers a drag operation on the skill control corresponding to the target skill, if the end point of the drag operation is the first region, the state of the target skill is adjusted to automatic release; and if the end point of the drag operation is the second region, the state of the target skill is adjusted to manual release.

In addition, there may be other modification manners, and the specific modification manner may be set according to the actual needs of the game, which is not limited in the embodiments of the present disclosure.

In another possible embodiment, it is also possible to pre-set the configuration of each virtual object's manual release and automatic release of skills in a semi-automatic state before the start of the game battle, so that the operation process during the game can be reduced.

In another embodiment, in the case where there are a plurality of auto-release skills among a plurality of skills corresponding to a certain virtual object, after the virtual object satisfies the preset skill release condition, the game engine may determine the skill to be released automatically from the plurality of skills and then release the determined skill based on the skill release order, or priority, among the plurality of auto-release skills. The skill release order or priority among the plurality of auto-release skills may be set by the user before the battle starts, or may be pre-configured by the game designer. Or, it can also be obtained by the user's own adjustment based on the default release order or priority after entering the battle and entering the third state of a target virtual character, so that the automatic release order of the skills of each virtual object can be flexibly controlled to further increase the operability of the game.

Those skilled in the art can understand that in the above-mentioned methods of the detailed description, the order in which the steps are written does not imply a strict order of execution that constitutes any limitation to the process of implementation, and that the specific order of execution of the steps should be determined by their function and possible internal logic.

Based on the same inventive concept, an interactive control apparatus corresponding to the interactive control method is further provided in the embodiments of the present disclosure. Because the principle of problem solving of the apparatus in the embodiments of the present disclosure is similar to the above-mentioned interactive control method in the embodiments of the present disclosure, the implementation of the apparatus can be referred to the implementation of the method, and repeated descriptions will not be repeated.

Figure 10:
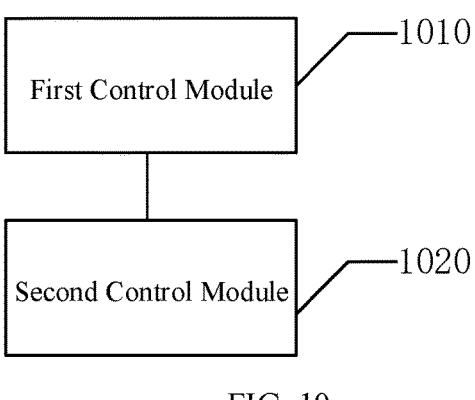
FIG. 10 illustrate a schematic diagram of an interactive control apparatus provided by some embodiments of the present disclosure.

Referring to FIG. 10, FIG. 10 is a schematic diagram of an interactive control apparatus provided by the embodiments of the present disclosure. The interactive control apparatus is applied to a terminal device; a virtual scene is displayed in an operation interface of the terminal device; the virtual scene includes a plurality of virtual objects and a virtual object identifier corresponding to each virtual object; and the interactive control apparatus includes a first control module 1010 and a second control module 1020.

The first control module 1010 is configured to, in response to a first trigger operation on a target control, control the plurality of virtual objects to enter a first state, and present a first indication information corresponding to the first state in a region corresponding to the virtual object identifier. The first state refers to a state in which a virtual object automatically releases a skill.

The second control module 1020 is configured to, in response to a first change operation on a state of a target virtual object, control the target virtual object to enter a second state, and present a second indication information corresponding to the second state in a region corresponding to a virtual object identifier of the target virtual object. The second state refers to a state in which a virtual object manually releases a skill, and the target virtual object is any one of the plurality of virtual objects.

Figure 11:
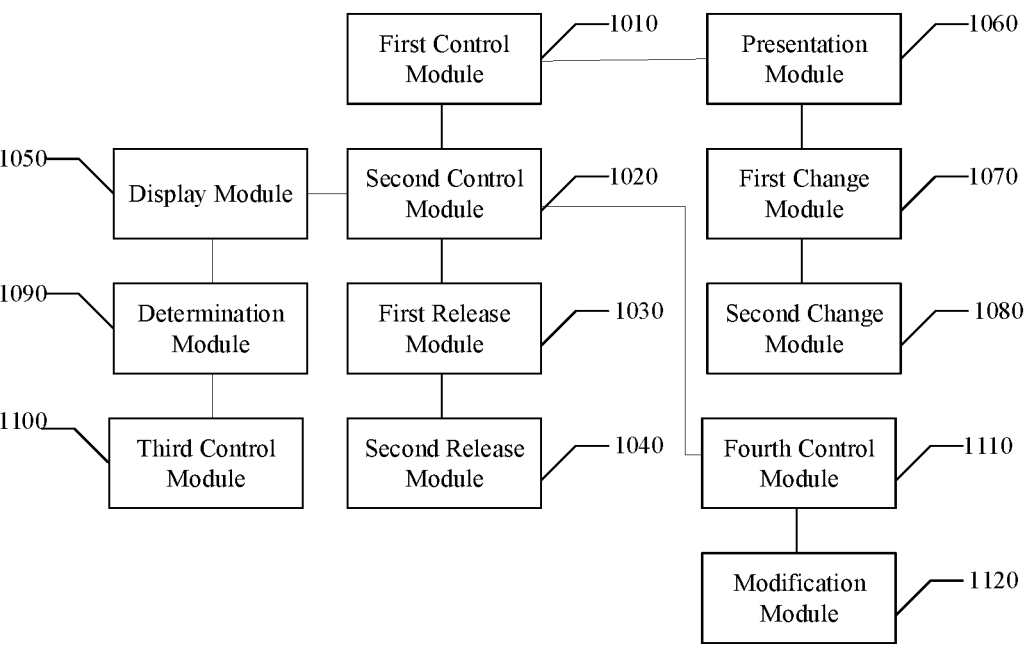
FIG. 11 illustrate a schematic diagram of an interactive control apparatus provided by some embodiments of the present disclosure.

In an alternative embodiment, referring to FIG. 11, a schematic diagram of another interactive control apparatus provided by an embodiment of the present disclosure further includes a first release module 1030 and a second release module 1040.

The first release module 1030 is configured to, in response to the target virtual object being in the first state, release a skill corresponding to the target virtual object in a case where the target virtual object satisfies a preset skill release condition.

The second release module 1040 is configured to, in response to the target virtual object entering the second state, release the skill corresponding to the target virtual object in response to a user trigger in the case where the target virtual object satisfies the preset skill release condition.

In an alternative embodiment, the interactive control apparatus further includes a display module 1050.

The display module 1050 is configured to display, in a preset manner, the virtual object identifier of the target virtual object entering the second state in a case where the target virtual object entering the second state satisfies the preset skill release condition.

In an alternative embodiment, the interactive control apparatus further includes a presentation module 1060, a first change module 1070 and a second change module 1080.

The presentation module 1060 is configured to present a first control indication information in a region where the target control is located before responding to the first trigger operation.

The first change module 1070 is configured to change the first control indication information presented in the region where the target control is located to a second control indication information after responding to the first trigger operation.

The second change module 1080 is configured to, in response to an amount of target virtual objects currently in the second state reaching a preset threshold, change the second control indication information presented in the region where the target control is located to the first control indication information.

In an alternative embodiment, the target virtual object satisfying the preset skill release condition includes: a first value associated with the target virtual object reaching a preset value. The first value is used to represent current accumulated amount of resource consumption required to release the skill corresponding to the target virtual object, or remaining time to trigger the virtual object identifier corresponding to the target virtual object not to respond to release of the skill.

In an alternative embodiment, the interactive control apparatus further includes a determination module 1090 and a third control module 1100.

The determination module 1090 is configured to determine whether an amount of target virtual objects currently in the second state reaches a preset threshold in response to a second trigger operation on the target control.

The third control module 1100 is configured to control the plurality of virtual objects to enter the first state in response to the amount of the target virtual objects currently in the second state reaching the preset threshold.

In an alternative embodiment, each virtual object corresponds to a plurality of skills, and the interactive control apparatus further includes a fourth control module 1110.

The fourth control module 1110 is configured to, in response to a second change operation on a state of the target virtual object, control the target virtual object to enter a third state, and present a third indication information corresponding to the third state in the region corresponding to the virtual object identifier of the target virtual object. The third state refers to a state in which the plurality of skills of the virtual object have both a skill of an automatic release state and a skill of a manual release state.

In an alternative embodiment, the interactive control apparatus further includes a modification module 1120.

The modification module 1120 is configured to, in a case where the target virtual object enters the third state, modify a release manner of a target skill in response to a state change operation on the target skill among a plurality of skills of the target virtual object.

The embodiments of the present disclosure can control a plurality of virtual objects to enter an automatic release skill state by performing a first trigger operation on a target control, and present a piece of first indication information corresponding to the automatic release skill state; and for a target virtual object among the plurality of virtual objects, the apparatus can control the target virtual object to enter a second state of manual release skill by performing a first change operation on the state of the target virtual object, and present a piece of second indication information corresponding to the manual release skill state. As such, when the skills are automatically released, the user can select the skills of some virtual objects to release manually, so as to not only ensure the automatic release of skills to reduce the user's operating pressure, but also be able to independently and manually release certain skills at an appropriate time to ensure the user's requirements to independently control the release of certain skills and improve the interactivity during the game.

Figure 12:
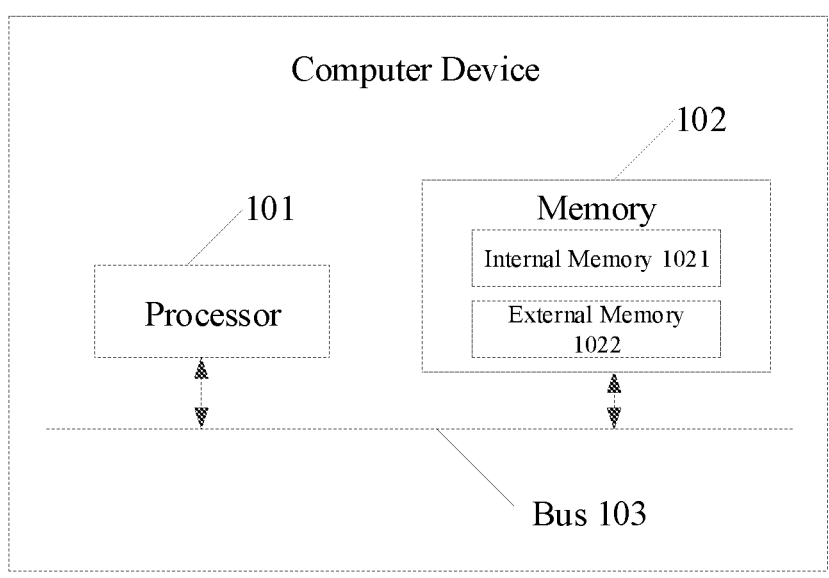
FIG. 12 illustrate a schematic diagram of a computer device provided by some embodiments of the present dis-closure.

The description of the processing flow of each module in the apparatus, and the interaction flow between the modules can be referred to the relevant descriptions in the above-mentioned method embodiments, and details will not be described here Based on the same technical idea, the embodiment of the present disclosure further provides a computer device. Referring to FIG. 12, FIG. 12 is a schematic structural diagram of a computer device provided by the embodiments of the present disclosure, and the computer device includes a processor 101, a memory 102, and a bus 103. The memory 102 is configured to store execution instructions, including a memory 1021 and an external memory 1022; the memory 1021 here is also called an internal memory, and is configured to temporarily store calculation data in the processor 101 and data exchanged with external memory 1022 such as a hard disk. The processor 101 exchanges data with the external memory 1022 through the memory 1021, and when the computer device is running, the processor 101 communicates with the memory 102 through the bus 103, so that the processor 101 executes the following instructions:

in response to a first trigger operation on a target control, controlling the plurality of virtual objects to enter a first state, and presenting a first indication information corresponding to the first state in a region corresponding to the virtual object identifier, and the first state refers to a state in which a virtual object automatically releases a skill; and in response to a first change operation on a state of a target virtual object, controlling the target virtual object to enter a second state, and presenting a second indication information corresponding to the second state in a region corresponding to a virtual object identifier of the target virtual object, wherein the second state refers to a state in which a virtual object manually releases a skill, and the target virtual object is any one of the plurality of virtual objects.

The embodiments of the present disclosure further provide a computer-readable storage medium, on which a computer program is stored, and when the computer program is executed by a processor, the steps of the interactive control method described in the above-mentioned method embodiments are executed. The storage medium may be a volatile or non-volatile computer-readable storage medium.

The computer program product of the interactive control method provided by the embodiments of the present disclosure includes a computer-readable storage medium storing program codes, and the instructions included in the program codes can be used to execute the steps of the interactive control method described in the above-mentioned method embodiments, for details, refer to the above-mentioned method embodiments, which will not be repeated here.

The embodiments of the present disclosure further provide a computer program, which implements any one of the methods in the preceding embodiments when the computer program is executed by a processor. The computer program product may be implemented specifically through hardware, software or a combination thereof. In an optional embodiment, the computer program product is embodied as a computer storage medium. In another optional embodiment, the computer program product is embodied as a software product, such as a software development kit (SDK), etc.

Those skilled in the art can clearly understand that for the convenience and brevity of the description, the specific working process of the systems and apparatuses described above can refer to the corresponding process in the foregoing method embodiments, which will not be repeated here. In the several embodiments provided in the present disclosure, it should be understood that the disclosed systems, apparatuses and methods may be implemented in other ways. The apparatus embodiments described above are only illustrative. For example, the division of the units is only a logical function division, and the actual implementation can be divided in another way. For another example, a plurality of units or components can be combined or can be integrated into another system, or some features can be ignored, or not implemented. On another point, the mutual coupling or direct coupling or communication connection illustrated or discussed may be through some communication interfaces, and the indirect coupling or communication connection of apparatuses or units may be in electrical, mechanical or other forms.

The units described as separate components may or may not be physically separated, and the components illustrated as units may or may not be physical units, that is, they may be located in one place, or may be distributed to multiple network units. Part or all of the units can be selected according to actual needs to achieve the purpose of the solutions of the present embodiment.

In addition, each functional unit in each embodiment of the present disclosure may be integrated into one processing unit, each unit may exist separately physically, or two or more units may be integrated into one unit.

If the functions are realized in the form of software function units and sold or used as independent products, they can be stored in a non-volatile computer-readable storage medium executable by a processor. Based on this understanding, the technical solution of the present disclosure is essentially or the part that contributes to the prior art or the part of the technical solution can be embodied in the form of a software product, and the computer software product is stored in a storage medium, including several instructions used to make a computer device (which may be a personal computer, a server, or a network device, etc.) execute all or part of the steps of the methods described in various embodiments of the present disclosure. The aforementioned storage medium includes a U disk, a mobile hard disk, a read-only memory (ROM), a random-access memory (RAM), a magnetic disk, an optical disk, or other medium that can store program codes.

Finally, it should be noted that the above-mentioned embodiments are only specific implementations of the present disclosure, and are used to illustrate the technical solutions of the present disclosure, rather than limit them, and the protection scope of the present disclosure is not limited thereto. Although the present disclosure is described in detail with reference to the foregoing embodiments, those of ordinary skill in the art should understand that any person familiar with the art within the technical scope disclosed in the present disclosure can still modify or readily conceivable changes to the technical solutions recorded in the foregoing embodiments, or make equivalent replacements to some of the technical features thereof; and these modifications, changes or replacements do not make the essence of the corresponding technical solution deviate from the spirit and scope of the technical solutions of the embodiments of the present disclosure, and all should be covered within the protection scope of the present disclosure. Therefore, the protection scope of the present disclosure should be defined by the protection scope of the claims.

The invention claimed is:

1. An interactive control method, applied to a terminal device, wherein a virtual scene is displayed in an operation interface of the terminal device, the virtual scene comprises a plurality of virtual objects and a virtual object identifier corresponding to each virtual object, and the interactive control method comprises:

in response to a first trigger operation on a target control, controlling the plurality of virtual objects to enter a first state that refers to a state in which the plurality of virtual objects automatically releases a skill, and presenting first indication information corresponding to the first state in a region corresponding to the virtual object identifier, wherein the first indication information indicates that the plurality of virtual objects are capable of automatically releases a skill; and in response to a first change operation on a state of a target virtual object, controlling the target virtual object to enter a second state that refers to a state in which the target virtual object manually releases a skill, and presenting second indication information corresponding to the second state in a region corresponding to a virtual object identifier of the target virtual object, wherein the second indication information indicates that the target virtual object is capable of manually releasing a skill, and the target virtual object is any one of the plurality of virtual objects, the first change operation for the state of the target virtual object comprises a trigger operation on the target virtual object or a trigger operation on a virtual object identifier associated with the target virtual object.

2. The method according to claim 1, further comprising:

in response to the target virtual object being in the first state, releasing a skill corresponding to the target virtual object in a case where the target virtual object satisfies a preset skill release condition; and in response to the target virtual object entering the second state, releasing the skill corresponding to the target virtual object in response to a user trigger in the case where the target virtual object satisfies the preset skill release condition.

3. The method according to claim 2, further comprising:

displaying, in a preset manner, the virtual object identifier of the target virtual object entering the second state in a case where the target virtual object entering the second state satisfies the preset skill release condition.

4. The method according to claim 1, further comprising:

presenting a first control indication information in a region where the target control is located before responding to the first trigger operation;

changing the first control indication information presented in the region where the target control is located to a second control indication information after responding to the first trigger operation; and in response to an amount of target virtual objects currently in the second state reaching a preset threshold, changing the second control indication information presented in the region where the target control is located to the first control indication information.

5. The method according to claim 2, wherein the target virtual object satisfying the preset skill release condition comprises:

a first value associated with the target virtual object reaching a preset value, wherein the first value is used to represent current accumulated amount of resource consumption required to release the skill corresponding to the target virtual object, or remaining time to trigger the virtual object identifier corresponding to the target virtual object not to respond to release of the skill.

6. The method according to claim 1, further comprising:

determining whether an amount of target virtual objects currently in the second state reaches a preset threshold in response to a second trigger operation on the target control; and controlling the plurality of virtual objects to enter the first state in response to the amount of the target virtual objects currently in the second state reaching the preset threshold.

7. The method according to claim 1, wherein each virtual object corresponds to a plurality of skills, and the method further comprises:

in response to a second change operation on a state of the target virtual object, controlling the target virtual object to enter a third state, and presenting a third indication information corresponding to the third state in the region corresponding to the virtual object identifier of the target virtual object, wherein the third state refers to a state in which the plurality of skills of the virtual object have both a skill of an automatic release state and a skill of a manual release state.

8. The method according to claim 7, further comprising:

in a case where the target virtual object enters the third state, modifying a release manner of a target skill in response to a state change operation on the target skill among the plurality of skills of the target virtual object.

9. An interactive control apparatus, applied to a terminal device, wherein a virtual scene is displayed in an operation interface of the terminal device, the virtual scene comprises a plurality of virtual objects and a virtual object identifier corresponding to each virtual object, and the interactive control apparatus comprises:

a first control module, configured to, in response to a first trigger operation on a target control, control the plurality of virtual objects to enter a first state that refers to a state in which the plurality of virtual objects automatically releases a skill, and present first indication information corresponding to the first state in a region corresponding to the virtual object identifier, wherein the first indication information indicates that the plurality of virtual objects are capable of automatically releasing a skill; and a second control module, configured to, in response to a first change operation on a state of a target virtual object, control the target virtual object to enter a second state that refers to a state in which the target virtual object manually releases a skill, and present second indication information corresponding to the second state in a region corresponding to a virtual object identifier of the target virtual object, wherein the second indication information indicates that the target virtual object is capable of manually releasing a skill, and the target virtual object is any one of the plurality of virtual objects, the first change operation for the state of the target virtual object comprises a trigger operation on the target virtual object or a trigger operation on a virtual object identifier associated with the target virtual object.

10. The interactive control apparatus according to claim 9, further comprising:

a first release module, configured to, in response to the target virtual object being in the first state, release a skill corresponding to the target virtual object in a case where the target virtual object satisfies a preset skill release condition; and a second release module, configured to, in response to the target virtual object entering the second state, release the skill corresponding to the target virtual object in response to a user trigger in the case where the target virtual object satisfies the preset skill release condition.

11. The interactive control apparatus according to claim 10, further comprising:

a display module, configured to display, in a preset manner, the virtual object identifier of the target virtual object entering the second state in a case where the target virtual object entering the second state satisfies the preset skill release condition.

12. The interactive control apparatus according to claim 9, further comprising:

a presentation module, configured to present a first control indication information in a region where the target control is located before responding to the first trigger operation;

a first change module, configured to change the first control indication information presented in the region where the target control is located to a second control indication information after responding to the first trigger operation; and a second change module, configured to, in response to an amount of target virtual objects currently in the second state reaching a preset threshold, change the second control indication information presented in the region where the target control is located to the first control indication information.

13. The interactive control apparatus according to claim 10, wherein the target virtual object satisfying the preset skill release condition comprises:

a first value associated with the target virtual object reaching a preset value, wherein the first value is used to represent current accumulated amount of resource consumption required to release the skill corresponding to the target virtual object, or remaining time to trigger the virtual object identifier corresponding to the target virtual object not to respond to release of the skill.

14. The interactive control apparatus according to claim 9, further comprising:

a determination module, configured to determine whether an amount of target virtual objects currently in the second state reaches a preset threshold in response to a second trigger operation on the target control; and a third control module, configured to control the plurality of virtual objects to enter the first state in response to the amount of the target virtual objects currently in the second state reaching the preset threshold.

15. The interactive control apparatus according to claim 9, wherein each virtual object corresponds to a plurality of skills, and the interactive control apparatus further comprises:

a fourth control module, configured to, in response to a second change operation on a state of the target virtual object, control the target virtual object to enter a third state, and present a third indication information corresponding to the third state in the region corresponding to the virtual object identifier of the target virtual object, wherein the third state refers to a state in which the plurality of skills of the virtual object have both a skill of an automatic release state and a skill of a manual release state.

16. The interactive control apparatus according to claim 9, further comprising:

a modification module, configured to, in a case where the target virtual object enters the third state, modify a release manner of a target skill in response to a state change operation on the target skill among a plurality of skills of the target virtual object.

17. A computer device, comprising a processor, a memory, and a bus, wherein the memory is configured to store machine-readable instructions executable by the processor, the processor is communicated with the memory via the bus when the computer device is in operation, the machine-readable instructions, when executed by the processor, are configured to perform an interactive control method, wherein the interactive control method is applied to a terminal device, a virtual scene is displayed in an operation interface of the terminal device, the virtual scene comprises a plurality of virtual objects and a virtual object identifier corresponding to each virtual object, and the interactive control method comprises:

an interactive control method applied to a terminal device, wherein a virtual scene is displayed in an operation interface of the terminal device, the virtual scene comprises a plurality of virtual objects and a virtual object identifier corresponding to each virtual object, and the interactive control method comprises:

in response to a first trigger operation on a target control, controlling the plurality of virtual objects to enter a first state that refers to a state in which the plurality of virtual objects automatically releases a skill, and presenting first indication information corresponding to the first state in a region corresponding to the virtual object identifier, wherein the first indication information indicates that the plurality of virtual objects are capable of automatically releasing a skill; and in response to a first change operation on a state of a target virtual object, controlling the target virtual object to enter a second state that refers to a state in which the target virtual object manually releases a skill, and presenting second indication information corresponding to the second state in a region corresponding to a virtual object identifier of the target virtual object, wherein the second indication information indicates that the target virtual object is capable of manually releasing a skill, and the target virtual object is any one of the plurality of virtual objects, the first change operation for the state of the target virtual object comprises a trigger operation on the target virtual object or a trigger operation on a virtual object identifier associated with the target virtual object.

18. A non-transitory computer-readable storage medium, wherein a computer program is stored on the computer-readable storage medium, and when the computer program is executed by a processor, one or more steps of the interactive control method according to claim 1 are executed.

* * * * *